(12) United States Patent
Mao et al.

(10) Patent No.: US 8,779,645 B2
(45) Date of Patent: Jul. 15, 2014

(54) GEAR MOTOR ASSEMBLY AND BRUSH MOTOR THEREOF

(75) Inventors: Wei Xing Mao, Rochester Hills, MI (US); Xiao Liang Yue, Shenzhen (CN); Fan OuYang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 148 days.

(21) Appl. No.: 13/570,869

(22) Filed: Aug. 9, 2012

(65) Prior Publication Data

US 2013/0038155 A1 Feb. 14, 2013

(30) Foreign Application Priority Data

Aug. 10, 2011 (CN) .......................... 2011 1 0228803

(51) Int. Cl.
*H02K 13/00* (2006.01)
(52) U.S. Cl.
USPC .......................................... 310/242; 310/245
(58) Field of Classification Search
USPC .................... 310/83, 71, 231–248, 98–99
See application file for complete search history.

(56) References Cited

U.S. PATENT DOCUMENTS

| 5,714,826 | A  | * | 2/1998  | Furukawa et al. | 310/251 |
|-----------|----|---|---------|-----------------|---------|
| 6,232,695 | B1 | * | 5/2001  | Klode           | 310/241 |
| 8,040,016 | B2 | * | 10/2011 | Fournier et al. | 310/251 |
| 2007/0108864 | A1 | * | 5/2007  | Suzuki       | 310/239 |
| 2008/0067888 | A1 | * | 3/2008  | Il et al.    | 310/245 |
| 2008/0174117 | A1 | * | 7/2008  | Hirabayashi  | 290/48  |
| 2010/0320857 | A1 | * | 12/2010 | Mizutani     | 310/83  |
| 2011/0187225 | A1 | * | 8/2011  | Bayer et al. | 310/245 |

FOREIGN PATENT DOCUMENTS

| GB | 2189653 A | 10/1987 |
|----|-----------|---------|
| GB | 2195835 A | 4/1988  |

* cited by examiner

*Primary Examiner* — Thanh Lam
(74) *Attorney, Agent, or Firm* — Muncy, Geissler, Olds & Lowe, P.C.

(57) ABSTRACT

A gear motor assembly includes a gearbox and a motor mounted to the gearbox. The gearbox includes a gear casing and a worm gear installed in the gear casing. The motor includes a stator, a rotor and brush gear. The rotor includes an shaft, a rotor core and a commutator fixed to the shaft. A worm integrally rotates with the shaft and is meshed with the worm gear. The brush gear includes multiple brushes slidably contacting the commutator, and multiple springs urging the corresponding brush towards the commutator. A lengthwise axis of the brush is inclined to a rotational axis of the commutator with a first angle between 75° to 87°.

20 Claims, 4 Drawing Sheets

GEAR MOTOR ASSEMBLY AND BRUSH MOTOR THEREOF

CROSS REFERENCE TO RELATED APPLICATIONS

This non-provisional patent application claims priority under 35 U.S.C. §119(a) from Patent Application No. 201110228803.9 filed in The People's Republic of China on Aug. 10, 2011.

FIELD OF THE INVENTION

This invention relates to a gear motor assembly and in particular to motor for a gear motor assembly with an improved brush assembly.

BACKGROUND OF THE INVENTION

A gear motor assembly, such as a window lift drive used in a vehicle to raise or lower a window, typically includes a bidirectional motor and a gearbox. The gearbox includes a casing and a gear train in the form of a worm and worm gear disposed in the casing. The motor includes a stator and rotor rotatable relative to the stator. The rotor includes a motor shaft, a core and a commutator fixed to the motor shaft. The motor shaft extends into the gearbox casing and has a worm which is meshed with the worm gear to rotate the worm gear.

The stator includes a motor housing, multiple magnets installed in an inner surface of the motor housing, and a brush assembly fixedly mounted to one end of the motor housing. The brush assembly includes a brush holder and multiple brushes each slidably received in a respective chamber of the brush holder. Gaps are formed between the brush and the inner surfaces of the chamber to allow the brush to slide through the chamber. Each brush is substantially perpendicular to a rotational axis of the commutator, and is urged towards the commutator by a spring which provides a force along the length of the brush. However, this type of motor will cause undesired vibration due to the gaps between the brushes and the respective chambers.

Therefore, there is a desire for a gear motor assembly with an improved brush assembly.

SUMMARY OF THE INVENTION

Accordingly, in a first aspect thereof, the present invention provides a brush motor comprising: a rotor comprising an shaft, a rotor core fixed to the shaft, and a commutator fixed to the shaft; and a stator comprising a housing; and brush gear comprising a plurality of brushes slidably contacting the commutator, and a plurality of springs, each of the springs generating a force urging the corresponding brush into contact with the commutator, wherein each brush has a lengthwise axis inclined to a rotational axis of the commutator at a first angle between 75° to 87°, and a second angle defined between the force and the rotational axis of the commutator is greater than the first angle.

Preferably, the force is substantially perpendicular to the rotational axis of the commutator.

Preferably, the first angle is between 80° to 83°.

Preferably, the first angle is between 81.5° to 82.5°.

Preferably, each brush is received in a corresponding brush holder, each brush holder has a bottom surface arranged to slidably support the brush, and the bottom surface is inclined to the rotational axis of the commutator.

Preferably, each brush is received in a corresponding brush holder, each brush holder defines a chamber to slidably receive the brush, and each brush holder has a resilient arm extending in the chamber and urging the brush against one side of the chamber.

Preferably, clearance between each brush and the chamber of the corresponding brush holder is between 4% and 10% of the relevant dimension of the brush.

Preferably, each brush has a contact face adapted to contact the commutator, the contact face is inclined to the rotational axis of the commutator.

Preferably, each brush has an end face that is in direct contact with the corresponding spring, the end face being substantially parallel to the rotational axis of the commutator.

Accordingly, in a second aspect thereof, the present invention provides a gear motor assembly comprising: a gearbox comprising a gear casing and a worm gear installed in the gear casing; and a motor mounted to the gearbox, the motor comprising: a rotor comprising an shaft, a rotor core fixed to the shaft, a commutator fixed to the shaft, the shaft extending in the gear casing; a stator comprising a housing; and brush gear comprising a plurality of brushes slidably contacting the commutator, and a plurality of springs, each of the springs generating a force to urge a corresponding brush towards the commutator; and a worm integrally rotating with the shaft and disposed within the gear casing in mesh with the worm gear; wherein each brush has a lengthwise axis inclined to a rotational axis of the commutator at a first angle between 75° to 87°, and a second angle defined between the force and the rotational axis of the commutator is greater than the first angle.

Preferably, the force is substantially perpendicular to the rotational axis of the commutator.

Preferably, the first angle is between 80° to 83°.

Preferably, the first angle is between 81.5° to 82.5°.

Preferably, each brush is received in a corresponding brush holder, each brush holder has a bottom surface arranged to slidably support the brush, and the bottom surface is inclined to the rotational axis of the commutator.

Preferably, each brush is received in a corresponding brush holder, each brush holder defines a chamber to slidably receive the brush, and each brush holder has a resilient arm extending in the chamber and urging the brush against one side of the chamber.

Preferably, each brush has a contact face adapted to contact the commutator, the contact face is inclined to the rotational axis of the commutator.

Preferably, each brush has an end face that is in direct contact with the corresponding spring, the end face being substantially parallel to the rotational axis of the commutator.

Preferably, an axial end of the shaft remote from the motor abuts against the gear casing via a first damper.

Preferably, an axial end of the shaft remote from the gearbox abuts against the motor housing via a second damper.

Preferably, clearance between each brush and the chamber of the corresponding brush holder is between 4% and 10% of the relevant dimension of the brush.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
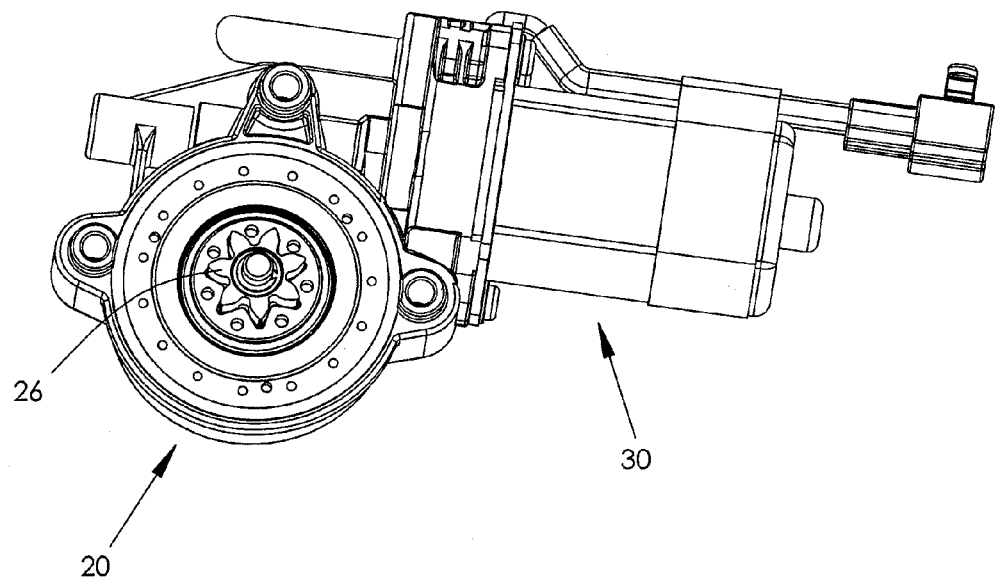
FIG. 1 is an assembled, isometric view of a gear motor assembly according to an exemplary embodiment of the present invention.
Figure 2:
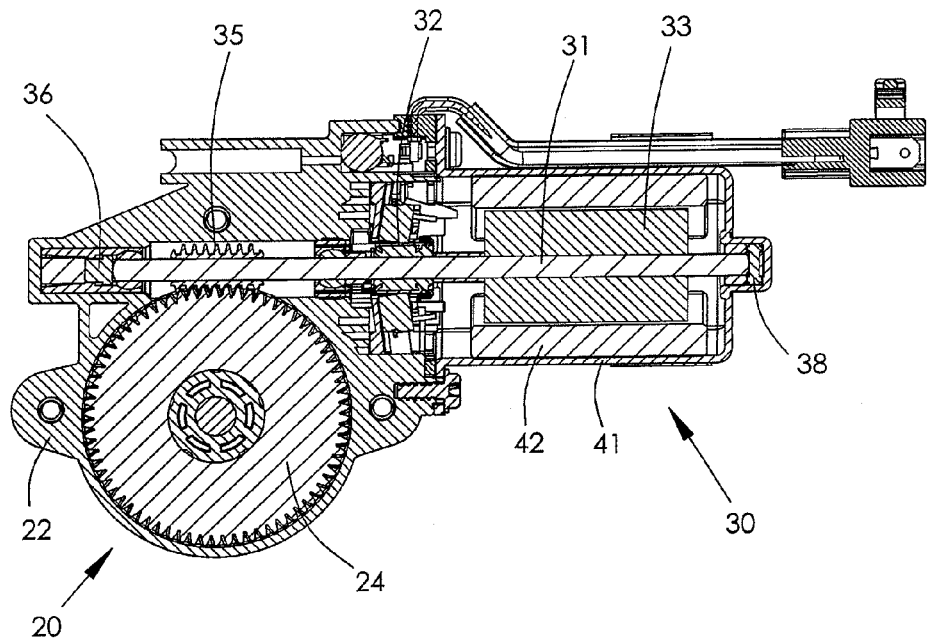
FIG. 2 is a sectional view of the gear motor assembly of FIG. 1.

Referring to FIGS. 1 and 2, the gear motor assembly according to an exemplary embodiment of the present invention is shown. The gear motor assembly can be a window lift drive used in a vehicle to raise or lower a window.

The gear motor includes a gearbox 20 and a motor 30 mounted to the gearbox 20. The gearbox 20 includes a gear casing 22, a worm gear 24 installed in the gear casing 22, and an output device (26) mounted to the worm gear 24. The motor 30 is a bidirectional motor.

The motor 30, in this embodiment, is a permanent magnet DC motor. The motor 30 includes a stator and a rotor. The stator includes a motor housing 41 with an open end at one axial end thereof, permanent magnets 42 mounted to an inner surface of the motor housing 41, and a brush assembly fixedly located at the open end of the motor housing 41. The rotor is received in the motor housing 41 and is rotatable with respect to the stator. The rotor includes an shaft 31, a commutator 32 and a rotor core 33 fixed on the shaft 31, and a worm 35 rotating with the shaft 31.

The worm 35 may be a cog fixed to the motor shaft 31. Alternatively, the worm 35 can be integrally formed with the motor shaft 31 as a monolithic construction by, for example, cutting or rolling. In this embodiment, the worm 35 is a separate cog which is press fitted onto the motor shaft 31. The worm 35 is meshed with the worm gear 24, so as to drive an output device 26 via the worm gear 24.

Figure 3:
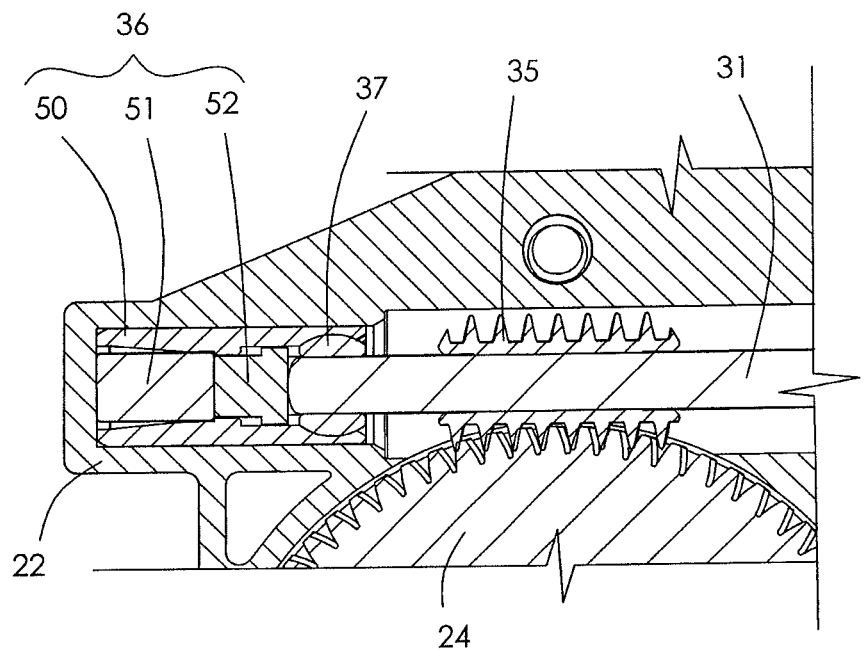
FIG. 3 is an enlarged view of a portion of the gear motor assembly of FIG. 2.
Figure 4:
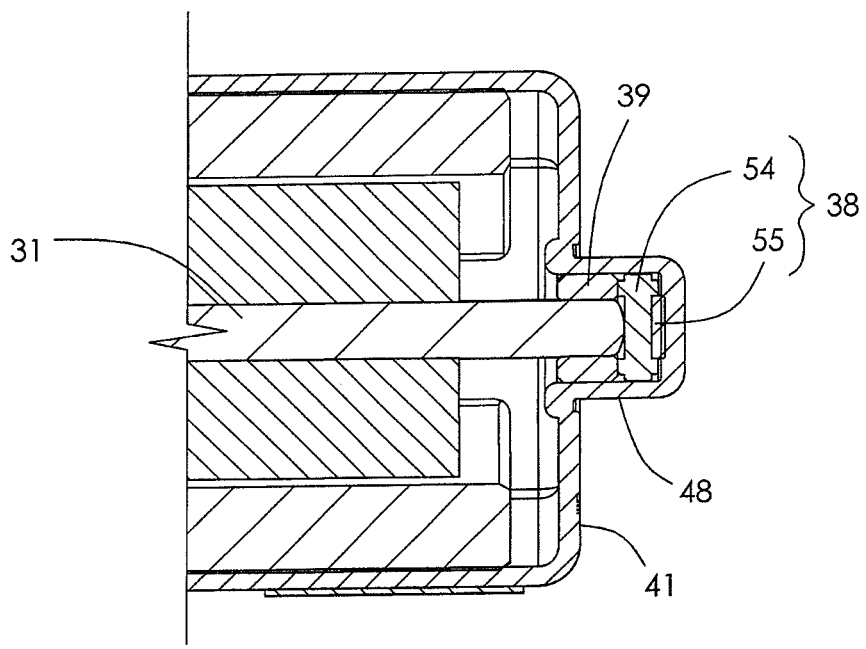
FIG. 4 is an enlarged view of another portion of the gear motor assembly of FIG. 2.

Referring also to FIGS. 3 and 4, one axial end of the motor shaft 31, remote from the motor 30, abuts against the gear casing 22 via a first damper 36. The other axial end of the motor shaft 31 abuts against the motor housing 41 via a second damper 38, such that axial vibration of the motor shaft 31 is absorbed by the first and second dampers 36 and 38.

The first damper 36 is mounted to an inner side of the gear casing 22 and located between the gear casing 22 and the axial end of the motor shaft 31, to eliminate end play there between. The first damper 36 includes a holding portion 50 fixedly located in the gear casing 22, a rubber pad 51 and a thrust cap 52 received in the holding portion 50. In this embodiment, the holding portion 50 is in the form of a hollow tube, and defines two open ends at opposite axial ends thereof. The holding portion 50 is fittedly received in the gear casing 22. The rubber pad 51 is received in the holding portion 50 and abuts against the inner surface of the gear casing 22. The thrust cap 52 is then received in the holding portion 50 and abuts against the rubber pad 51, such that the rubber pad 51 is sandwiched between the thrust cap 52 and the inner surface of the gear casing 22. A first bearing 37 is also received in the holding portion 50 and located adjacent to but spaced from the thrust cap 52. The motor shaft 31 is supported by the first bearing 37. A first axial end of the motor shaft 31 abuts against the thrust cap 52.

The first damper 36 is sandwiched between the first end of the motor shaft 31 and the inner surface of the gear casing 22, eliminating end play between the first end of the motor shaft 31 and the gear casing 22. Further, the rubber pad 51 functions as a damper which absorbs axial vibration of the motor shaft 31 when the direction of rotation changes.

The second damper 38 is mounted to the inside of the motor housing 41, and located between the motor housing 41 and a second axial end of the motor shaft 31, to eliminate end play there between. The motor housing 41 forms a tube portion 48 for receiving the second damper 38. The second damper 38 includes a thrust cap 54 and a rubber pad 55. The thrust cap has an outer diameter substantially the same as an inner diameter of the tube portion 48 of the motor housing 41, such that the thrust cap 54 is a press fit within the tube portion 48. The rubber pad 55 is placed in the tube portion 48 with one face abutting against the inner end of the tube portion 48. The thrust cap 54 is then pressed into the tube portion 48 and abuts against an opposite face of the rubber pad 55, such that the rubber pad 55 is sandwiched between the thrust cap 54 and the inner surface of the tube portion 48. Preferably the rubber pad 55 is received in a cavity formed by a recess in the thrust cap and a recess formed in the end of the tube portion 48. A second bearing 39 is also received in the tube portion 48 and located adjacent to the thrust cap 54. The motor shaft 31 is supported by the second bearing 39, and the second end of the motor shaft 31 abuts against the thrust cap 54. Due to the second damper 38, end play between the second end of the motor shaft 31 and the motor housing 41 is eliminated. In addition, the rubber pad 55 functions as a damper which absorbs axial vibration of the motor shaft 31 when the motor shaft 31 changes direction of rotation.

Figure 5:
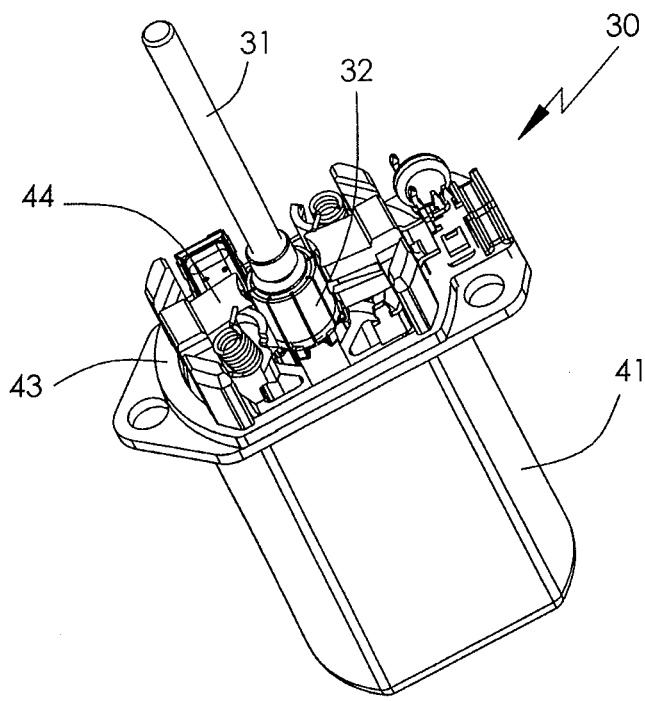
FIG. 5 shows a motor of the gear motor assembly of FIG. 1.
Figure 6:
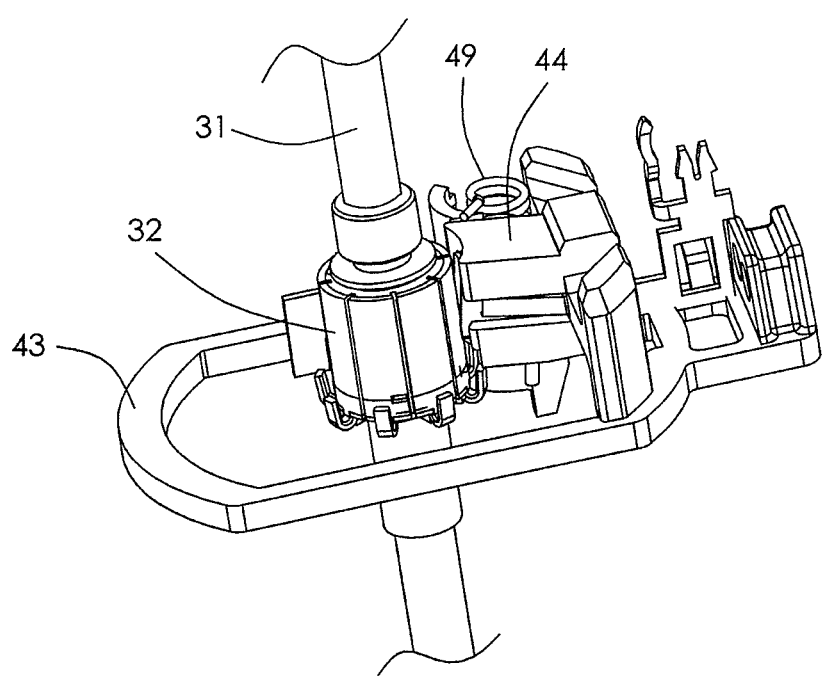
FIG. 6 shows a commutator and brush of the motor of FIG. 5.
Figure 7:
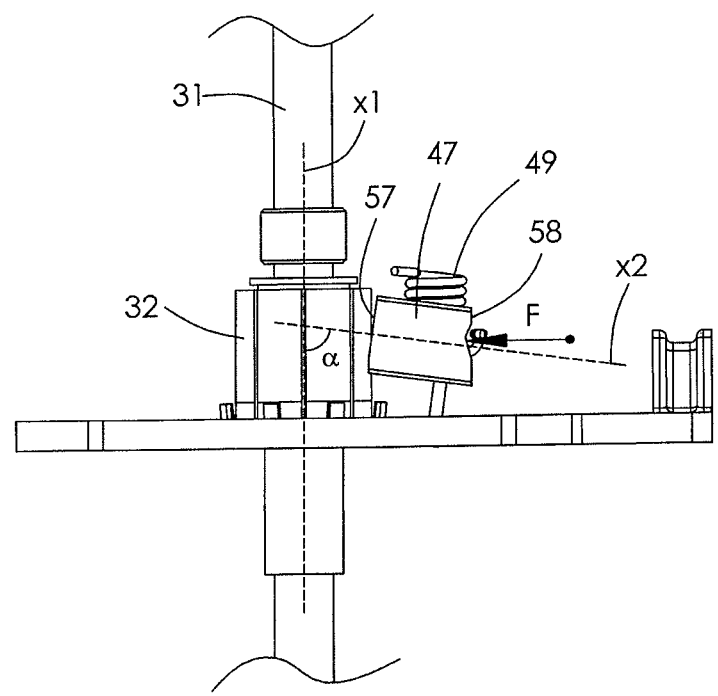
FIG. 7 is a side view of the commutator and brush shown in FIG. 6.

Referring to FIGS. 5 through 7, a seal 43 is provided at the interface of the motor housing 41 and the gear casing 22, to seal the motor housing to the gear casing.

The brush assembly includes a plurality of brush holders 44 each defining a chamber therein, a plurality of brushes 47 slidably received in respective chambers of the brush holders 44, and springs 49, each of which is arranged to urge a corresponding brush 47 towards the commutator 32. In this embodiment, each spring 49 is a torsion spring.

As the brush assemblies is substantially identical, one brush assembly will now be described in detail by way of example. The chamber of the brush holder 44 includes a bottom surface 45 to support a bottom of the brush 47. The bottom surface 45 of the brush holder 44 is inclined to a rotational axis x1 of the commutator 32 at an angle α between 75° to 87°. That is to say, a lengthwise axis x2 of the brush 47 is inclined to the rotational axis x1 of the commutator 32 by the angle α. The angle α is preferably between 80° to 83°, and in this embodiment, the angle α is between 81.5° to 82.5°.

A force F acts on an outer end of the brush 47 by the spring 49 to urge the brush 47 towards the commutator 32. A second angle defined between the force F and the rotational axis x1 of the commutator 32 is greater than the angle α. Preferably, the second angle is substantial 90°, in other words, the force F is substantially perpendicular to the rotational axis x1 of the commutator 32. The outer end of the brush 47 has an end face 58 which the spring 49 directly contacts. The end face 58 of the brush 47 is substantially perpendicular to the force F. That is, the end face 58 of the brush 47 is substantially parallel to the rotational axis x1 of the commutator 32, as shown in FIG. 7.

As the brush 47 wears, the spring 49 urges the brush 47 towards the commutator 32 to assure good contact between the brush 47 and the commutator 32. Since an inner end of the brush 47 is inclined to the commutator 32, a contact face 57 of the brush 47, inclined to the rotational axis x1 of the commutator 32, gradually increases while the brush 47 wears, which produces a low starting torque when the motor 30 starts.

Figure 8:
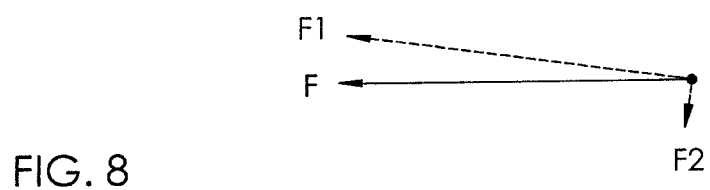
FIG. 8 is a force vector diagram showing the components of the force acting on the brush of FIG. 7.

Referring to FIG. 8, the force F can be divided into a first component F1 along the length of the brush 47, i.e., the lengthwise axis x2 of the brush 47, and a second component F2 perpendicular to the length of the brush 47. The second component F2 eliminates any up and down vibration of the brush 47 which is caused by thread traces on the surface of the commutator 32 formed during manufacturing.

Figure 9:
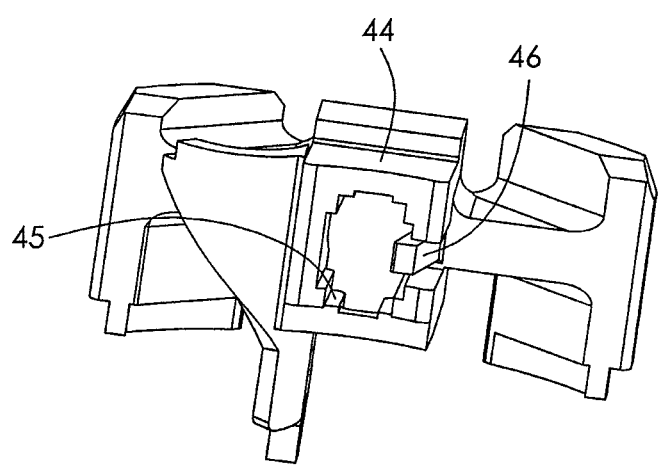
FIG. 9 is an isometric view of a brush holder of the motor of FIG. 5.

Referring to FIG. 9, a resilient arm 46 is formed at one side of each brush holder 44. The resilient arm 46 extends into the chamber and urges the brush 47 against one side of the chamber, thereby eliminating vibration of the brush 47 from side to side. In addition, due to the resilient arm 46, a greater clearance between the brush 47 and the chamber is allowed, thus preventing stuck brush or hung brush due to thermal expansion of the brush 47 during operation. In this embodiment, the brush holder 44, and the resilient arm 46 are integrally formed as a monolithic construction by a single molding, such as injection molding.

Due to the resilient arm, the clearance between the brush and the chamber of the brush holder may be increased over prior art designs. Previously, the clearance was required to be as small as possible to provide a stable brush position to avoid sparking and erratic motor performance as vibrations caused the position of the contact between the brush and the commutator to change. However, small clearances lead to the brush being hung up or jammed in the chamber due to thermal expansion of the brush during heavy use or from build up of brush dust and other debris. Generally the clearance would be between 1% and 4% of the relevant brush dimension, i.e., width or height. However, with the resilient arm, this clearance can be increased to more than 4%, but preferable to 10% or less. Similarly, the use of the inclined sliding surface of the chamber and the direction of the force of the spring, the clearance between the brush and the chamber in the height direction of the brush or axial direction of the motor, can be increased to between 4% an 10% as well. This means that the brush assembly is less affected by large changes in the operating temperature of the brushes.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A brush motor comprising:
a rotor comprising an shaft, a rotor core fixed to the shaft, and a commutator fixed to the shaft; and
a stator comprising a housing; and
brush gear comprising a plurality of brushes slidably contacting the commutator, and a plurality of springs, each of the springs generating a force urging the corresponding brush into contact with the commutator,
wherein each brush has a lengthwise axis inclined to a rotational axis of the commutator at a first angle between 75° to 87°, and a second angle defined between the force and the rotational axis of the commutator is greater than the first angle.

2. The motor of claim 1, wherein the force is substantially perpendicular to the rotational axis of the commutator.

3. The motor of claim 1, wherein the first angle is between 80° to 83°.

4. The motor of claim 1, wherein the first angle is between 81.5° to 82.5°.

5. The motor of claim 1, wherein each brush is received in a corresponding brush holder, each brush holder has a bottom surface arranged to slidably support the brush, and the bottom surface is inclined to the rotational axis of the commutator.

6. The motor of claim 1, wherein each brush is received in a corresponding brush holder, each brush holder defines a chamber to slidably receive the brush, and each brush holder has a resilient arm extending in the chamber and urging the brush against one side of the chamber.

7. The motor of claim 6 wherein clearance between each brush and the chamber of the corresponding brush holder is between 4% and 10% of the relevant dimension of the brush.

8. The motor of claim 1, wherein each brush has a contact face adapted to contact the commutator, the contact face is inclined to the rotational axis of the commutator.

9. The motor of claim 1, wherein each brush has an end face that is in direct contact with the corresponding spring, the end face being substantially parallel to the rotational axis of the commutator.

10. A gear motor assembly comprising:
a gearbox comprising a gear casing and a worm gear installed in the gear casing; and
a motor mounted to the gearbox, the motor comprising:
a rotor having an shaft, a rotor core fixed to the shaft, a commutator fixed to the shaft, the shaft extending in the gear casing;
a stator comprising a housing; and
brush gear comprising a plurality of brushes slidably contacting the commutator, and a plurality of springs, each of the springs generating a force to urge a corresponding brush towards the commutator; and
a worm integrally rotating with the shaft and disposed within the gear casing in mesh with the worm gear,
wherein each brush has a lengthwise axis inclined to a rotational axis of the commutator at a first angle between 75° to 87°, and a second angle defined between the force and the rotational axis of the commutator is greater than the first angle.

11. The gear motor assembly of claim 10, wherein the force is substantially perpendicular to the rotational axis of the commutator.

12. The gear motor assembly of claim 10, wherein the first angle is between 80° to 83°.

13. The gear motor assembly of claim 10, wherein the first angle is between 81.5° to 82.5°.

14. The gear motor assembly of claim 10, wherein each brush is received in a corresponding brush holder, each brush holder has a bottom surface arranged to slidably support the brush, and the bottom surface is inclined to the rotational axis of the commutator.

15. The gear motor assembly of claim 10, wherein each brush is received in a corresponding brush holder, each brush holder defines a chamber to slidably receive the brush, and each brush holder has a resilient arm extending in the chamber and urging the brush against one side of the chamber.

16. The gear motor assembly of claim 10, wherein each brush has a contact face adapted to contact the commutator, the contact face is inclined to the rotational axis of the commutator.

17. The gear motor assembly of claim 10, wherein each brush has an end face that is in direct contact with the corresponding spring, the end face being substantially parallel to the rotational axis of the commutator.

18. The gear motor assembly of claim 10, wherein an axial end of the shaft remote from the motor abuts against the gear casing via a first damper.

19. The gear motor assembly of claim 18, wherein an axial end of the shaft remote from the gearbox abuts against the motor housing via a second damper.

20. The gear motor assembly of claim 10, wherein clearance between each brush and the chamber of the corresponding brush holder is between 4% and 10% of the relevant dimension of the brush.

* * * * *